US006629183B1

United States Patent
Gortz et al.

(10) Patent No.: US 6,629,183 B1
(45) Date of Patent: Sep. 30, 2003

(54) INTERFACE DEVICE FOR TRANSMITTING INFORMATION BETWEEN INPUT/OUTPUT MEANS

(75) Inventors: Udo Gortz, Bochum (DE); Wolfgang Theimer, Bochum (DE); Ari Salomaki, Bochum (DE)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/422,784

(22) Filed: Oct. 21, 1999

(30) Foreign Application Priority Data

Oct. 22, 1998 (DE) .......................... 198 48 791

(51) Int. Cl.[7] .................. G06F 13/00; G06F 13/14; G05D 1/00; G01C 21/26; H04B 7/185
(52) U.S. Cl. .................. 710/305; 710/300; 710/100; 710/306; 701/1; 701/200; 701/206; 342/357.12; 342/357.13
(58) Field of Search .................. 701/1, 200, 206, 701/207, 208, 209, 213–216, 219, 22–23; 342/357.12, 357.13, 357.14, 367, 451, 457; 710/100, 305, 306, 300

(56) References Cited

U.S. PATENT DOCUMENTS 5,059,970 A * 10/1991 Raubenheimer et al. .... 342/451
5,440,740 A * 8/1995 Chen et al. .................. 709/104
5,544,087 A * 8/1996 Nakajima et al. ........... 701/200
5,897,618 A * 4/1999 Loats et al. .................. 704/275
6,195,597 B1 * 2/2001 Yamada ........................ 701/1

* cited by examiner

Primary Examiner—Xuan M. Thai
Assistant Examiner—Tim Vo
(74) Attorney, Agent, or Firm—Perman & Green, LLP

(57) ABSTRACT

The invention relates to an interface device (10) for transmitting information between input/output means (12, 13) and application units (11) in an information and/or communication system. In order, to be able to operate application units with different output/input means of a user interface without changing their input/output interface, the interface device comprises an interface circuit (14) and a storage device (15), connected to the interface circuit (14) for system data and input/output formats and structures, the interface circuit (14) processing input and/or output information to be transmitted in accordance with the stored system data as a function of the input/output means (12, 13) available with the aid of the stored input/output formats and structures, and outputting said information to the respective application unit (11) and/or to the input/output means (12, 13) available.

12 Claims, 3 Drawing Sheets

# INTERFACE DEVICE FOR TRANSMITTING INFORMATION BETWEEN INPUT/OUTPUT MEANS

BACKGROUND OF THE INVENTION

1. Field of the Invention

The invention relates to an interface device for transmitting information between input/output means and application units in an information and/or communication system.

2. Discussion of the Related Art

Information and/or communication systems such as are used, in particular, in motor vehicles, have user interfaces in order to permit dialogue between the user and the application units of this system. In such systems, application units are, for example, radios, CD players, cassette recorders, mobile telephones, but also navigation devices and systems as well as onboard computers, diagnostic systems and the like. For the purpose on inputting and outputting information, in particular for setting and operating the individual application units, depending on the complexity the user interfaces have rotary actuators, keys and/or pushbuttons with specifically assigned functions, alphanumeric keyboards, selector keys, and/or voice input means for inputting voice commands, letters and numbers or individual words. Output means of the user interface comprise, for example, optical display means such as, for example, light-emitting diodes or liquid crystal displays or graphic display screens such as are suitable, for example, for reproducing video pictures. In addition, it is also possible to provide message means for acoustic output of information as well as haptic message means which, upon operation of rotary actuators and pushbuttons, supply tangible feedback on the execution of operating functions.

In order in the case of given input/output means to permit dialogue between the user and an application unit, the respective application unit must have an input/output interface which processes input and output information or data in accordance with the possibilities and properties of the input/output means.

It is therefore necessary to equip one and the same application unit with different input/output interfaces if it is to be used with different input/output means. A further disadvantage consists in that the input/output interface of a specific application unit must, in turn, be redesigned if the corresponding application unit is to be used with new, improved input/output means of a user interface.

DE 196 25 002 A1 discloses a communication system for motor vehicles which has a central vehicle computer and a number of peripheral devices for transmitting, receiving, establishing and/or processing data for telematic applications which are carried out by the central computer. The peripheral devices are connected in this case to the central computer via at least one data channel and assigned interfaces. In this case, adaptive application control is effected independently of the telematic applications, and communicates with the latter via a further data format, in order to be able for each application, for example, for route planning, a remote diagnosis or anti-theft protection, to select flexibly the required device, that is to say, for example, RDS radio, GSM mobile radio, GPS receiver, and the suitable interface such as, for example, an infrared interface, plug-in connector or PCMCIA slot.

In the case of this communication system, as well, the individual application units, that is to say the RDS radio or the GSM mobile telephone or the GPS unit, must have input/output interfaces which can exchange data with the input/output means of the user interface which are present in the respective motor vehicle.

SUMMARY OF THE INVENTION

It is the object of the invention to provide an interface device which permits application units to be capable of use with the most varied input/output means of a user interface without the need to change the input/output interface of the application units.

This object is achieved by means of the interface device according to claim 1. Advantageous developments and refinements of the invention are described in the subclaims.

Thus, according to the invention an interface device for transmitting information between input/output means and application units has an interface circuit and a storage device, connected thereto, for system data and input/output formats and structures, the interface circuit processing input and/or output information to be transmitted in accordance with the stored system data as a function of the input/output means available with the aid of the stored input/output formats and structures, and outputting said information to the respective application unit and/or to the input/output means available.

The use of the interface device according to the invention renders it possible to use an application unit, for example a radio, mobile telephone or a navigation system with different input/output means, without the need for changes to the application unit. It is particularly advantageous in this case that the application units need output only the pure information or information requirements, or even only information codes, while the interface device provides the appropriate output formats and any dialogue structures required.

In an advantageous refinement of the invention, it is provided that the storage device has at least one further write-read access via which further information can be written in from outside, and information already stored can be updated. The additional write-read access to the storage device permits not only simple storage of the input/output formats and structures for a specific configuration of an information and/or communication system, but also simple adaptation to changed system configurations, or simple updating after the exchange of individual application units by further-developed and improved application units of the same type or after the provision of new applications and services which can be used with the existing application units.

In order for the possibilities for adapting the interface device according to the invention to different and/or changed system configurations to be further improved and more flexibly configured, in a further refinement of the invention it is provided that the storage device has an access device of reading or for reading and writing data on an exchangeable storage means.

A particularly advantageous refinement of the invention is distinguished in that the interface circuit has a structure interface which is connected to the storage device, can be connected to application units via unit interfaces on the application side, and can be connected to the input/output means via at least one driver interface, appropriate driver interface being provided both for optical and acoustic and for tactile/haptic input/output means. Thus, according to the invention the interface circuit is subdivided into a structure interface and one or more driver interfaces, with the result that the interface device can be adapted particularly easily to the respective system configuration. In particular, in the case of changes to the system configuration on the application side there is only a need for changes to the structure and format data for the structure interface in the storage device. The driver interfaces are expediently designed in this case such that they can drive virtually any input/output means.

A preferred development of the invention is distinguished in that each driver interface has adaptation means which can be used to adapt the output/input information in accordance with the characteristics of the assigned input/output means.

BRIEF DESCRIPTION OF THE DRAWINGS

The invention is explained in more detail below by way of example with the aid of the drawing, in which.

DETAILED DESCRIPTION OF THE PREFERRED EMBODIMENTS

Figure 1:
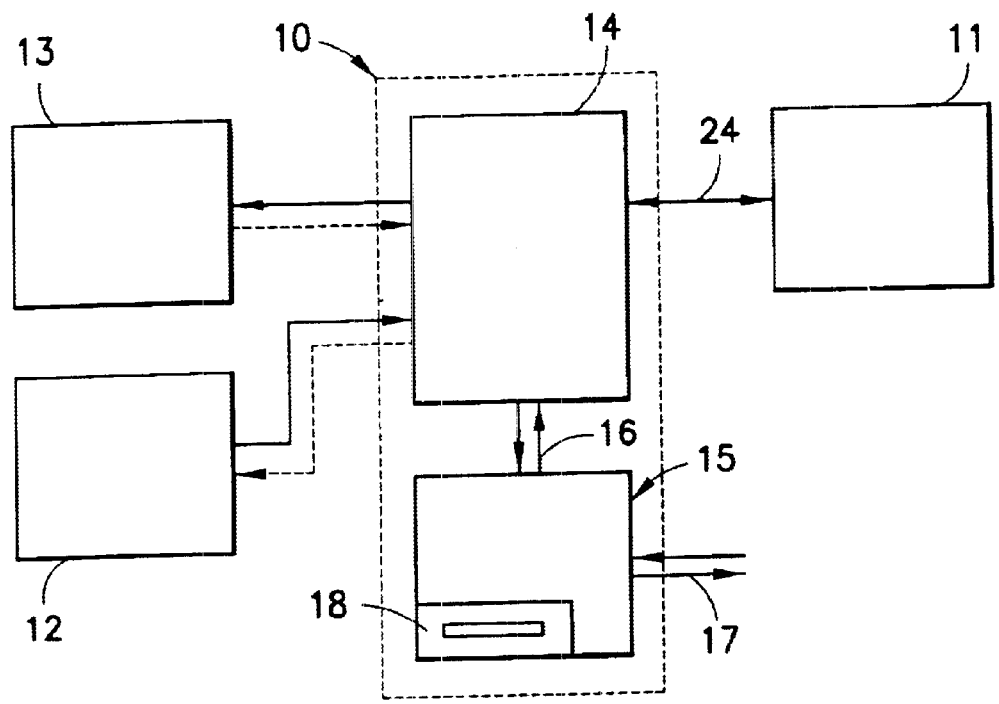
FIG. 1 shows a simplified schematic block diagram of an information and/or communication system having the interface device according to the invention.

Mutually correspondent components are provided with identical reference numerals in the various figures of a drawing.

As represented schematically in FIG. 1, according to the invention an information and/or communication system such as is used, in particular, in motor vehicles has an interface device 10 which is connected for the purpose of transmitting information between application units 11 of which only one is represented schematically, and input means 12 as well as output means 13. The interface device 10 comprises an interface circuit 14 and a storage device 15, connected thereto, for system data and input/output formats and structures. In addition to a write-read access 16, via which the storage device 15 is connected to the interface circuit 14, the storage device 15 has a further write-read access 17 via which the data stored in the storage device 15 can be updated from outside. In order to update or supplement the data and information stored in the storage device 15, it is possible when one of the connected application units 11 is a mobile radio telephone for the corresponding updating and supplementing data to be loaded into the storage device 15 via the mobile telephone, the interface circuit 14 and the write-read access 16. Moreover, instead of the write-read access 17, or in addition thereto, the storage device 15 can have an access device 18 to an exchangeable storage means. It is possible here to provide, for example, a memory card slot, similar to a smart card or SIM card slot, a PCMCIA slot or also a CD drive.

Figure 2:
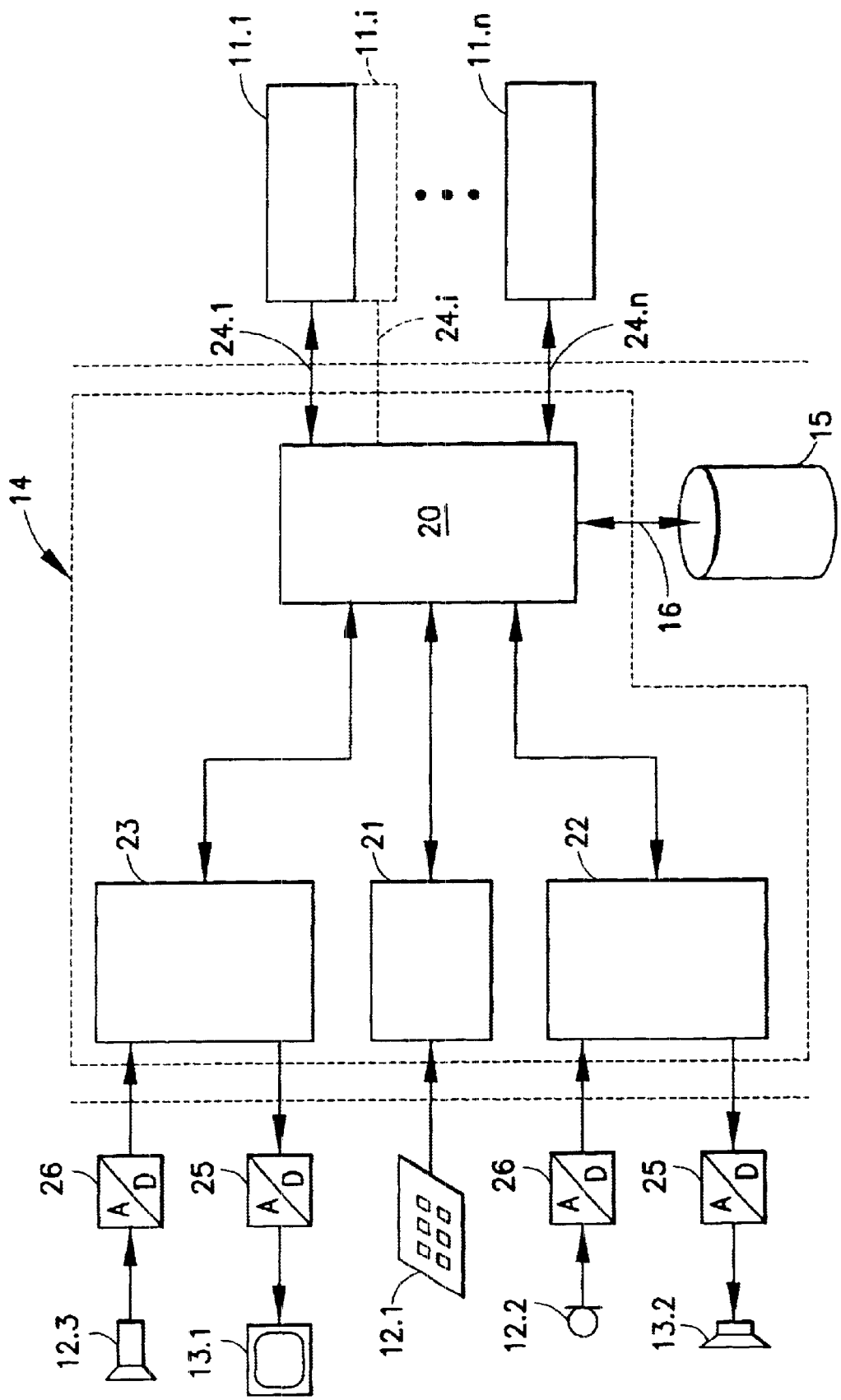
FIG. 2 shows a simplified schematic block diagram of an information and/or communication system, in which the interface device is represented in more detail.

As FIG. 2 shows, the interface circuit 14 comprises a structure interface 20 which is connected on the user side to a tactile/haptic driver interface 21, an audio driver interface 22 and a video driver interface 23. On the application side, the structure interface 20, which is connected to the storage device 15 via the write-read access 16, is connected to application units 11.1, . . . 11.n via unit interfaces 24.1, . . . 24.n.

The tactile/haptic driver interface 21 serves chiefly to convert input data which are input via a tactile/haptic input means 12.1 designed, for example, as a keyboard or as a rotary/pushbutton actuator or as a combination thereof. Provided as preferred output means are a display screen 30.1 and a loudspeaker 30.2 which are connected to the video and audio driver interface 23 and 22, respectively, via appropriate digital-to-analogue converters 25. For the purpose of acoustic input of data, that is to say of inputting voice commands and other spoken information, a microphone 12.2, which is connected to the audio driver interface 22 via an analogue-to-digital converter 26, is provided at acoustic input means. Provided for the purpose of inputting information optically is an optical receiver device, for example a video camera 12.3, which is connected to the video driver interface 23 via an appropriate analogue-to-digital converter 26.

Figure 3:
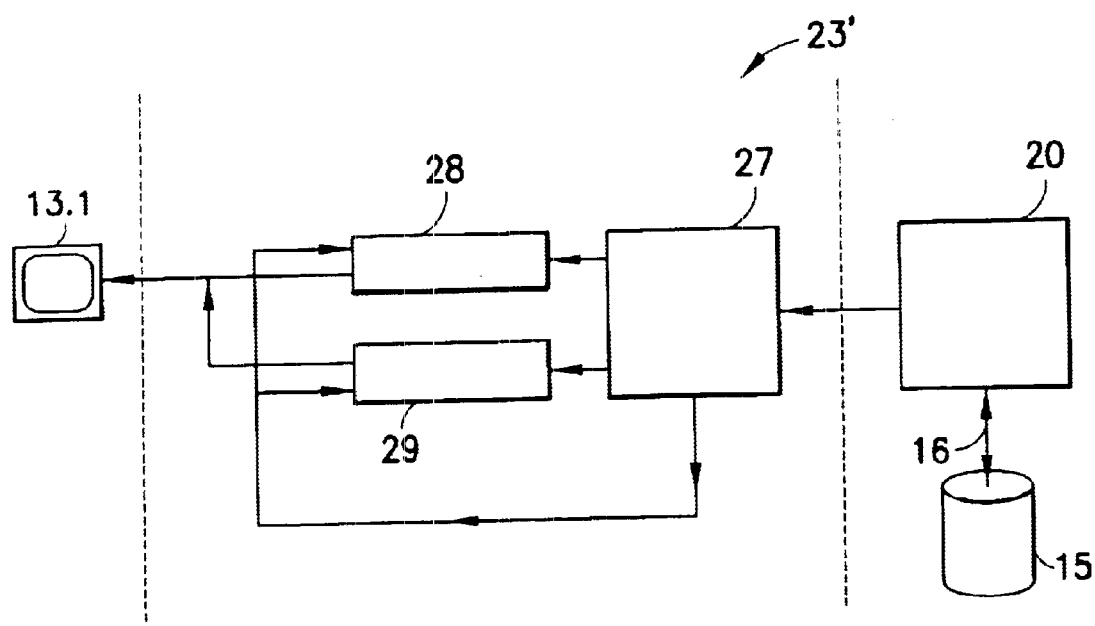
FIG. 3 shows a simplified schematic block diagram of an optical driver interface in an interface device according to the invention.

FIG. 3 shows a video driver interface 23' which serves only as output means and has a mode selection circuit 27 which supplies output data, supplied by the structure interface 20, to a video/graphics converter 28 and an image generator 29 for the purpose of representation on the display screen 13.1. In this case, the output data fed are evaluated, in order optionally to activate the video/graphics converter 28 and the image generator 29 such that the output data can be displayed in accordance with the possibilities of the display screen 13.1.

Figure 4:
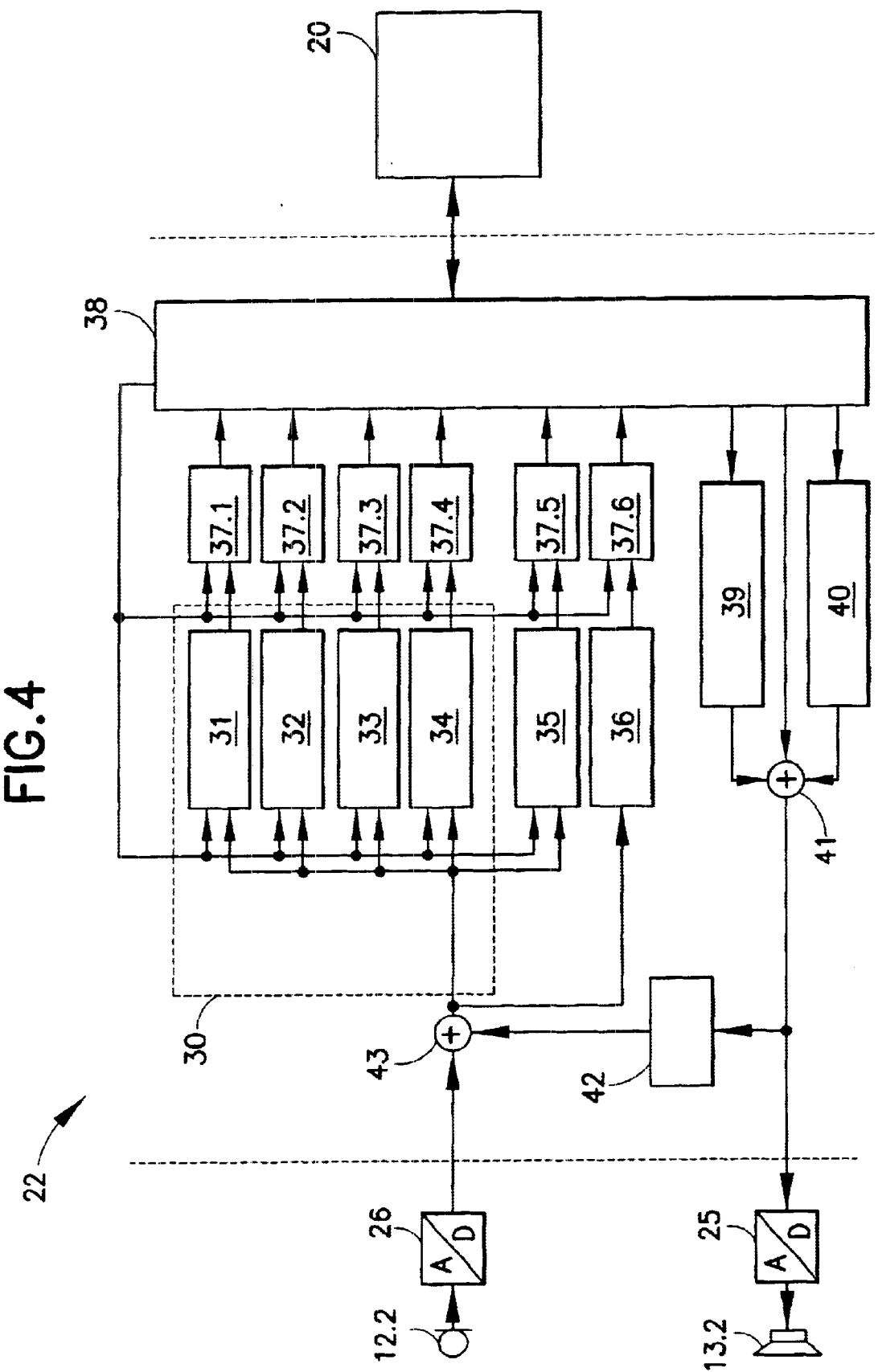
FIG. 4 shows a simplified schematic block diagram of an acoustic driver interface in an interface device according to the invention.

According to FIG. 4, an audio driver interface 22 has in its input circuit a monitoring circuit 30 with a voice command recognition circuit 31, a number recognition circuit 32, a letter recognition circuit 33 and an activation circuit 34 which responds to speech. Apart from being applied via the analogue-to-digital converter 26 to the monitoring circuit 30, the input signal from the microphone 12.2 is applied to a speech recognition circuit 35 and a pitch recognition and tracking circuit 36.

The output signals of the recognition circuits 31 and 36 are applied via downstream converters 37.1 to 37.6 to a control circuit 38 which controls the recognition circuits 31 to 36 as a function of the required or requested input information, and relay the corresponding output signals of the converters 37.1 to 37.6 to the structure interface 20.

Output data are supplied by the control circuit 38 via a voice generator 39 or via an audio decoder 40 or directly to a signal adder circuit 41 whose output signal is applied to the loudspeaker 13.2 via a digital-to-analogue converter 25, with the result that the information is announced.

In order when announcing information to prevent the erroneous activation of the input circuits of the audio driver interface 22, the output signal is applied by the signal adder circuit 41 via an echo suppression circuit 42 to a further signal adder circuit 43 situated in the input circuit, with the result that the echo signal received by the microphone 12.2 is suppressed.

The operation of the interface device according to the invention within an information and/or communication system is explained below.

After the system is switched on, the interface circuit 14 firstly determines which input/output means are connected, and stores appropriate data describing the system. Instead of an interrogation after each instance of switching on, it can also be provided that the corresponding system data are detected once when the input/output means 12, 13 connected to the interface device 10 are first taken into service, and are written into the storage device 15 directly or from outside, for example via the write/read access 17. Furthermore, the information required for a corresponding system configuration can also be stored on a data medium which is arranged in the access device 18 of the storage device 15.

For the connected application units, system data and input/output formats and structures are stored in a corresponding way for each application which can be carried out with the connected application units 11.

If, for example, a navigation system 11.i is connected as application unit 11 to the interface device 10, and if a user wishes to be guided to a specific destination, a navigation system 11.i firstly requests him to input the destination. For this purpose, the navigation system 11.i supplies an instruction mark to the structure interface 20. Using the transmitted instruction mark, the structure interface then accesses a corresponding data record in the storage device 15, which contains for the target input request, for example, the entire dialogue structure with the response solicitations to be output to the user. The structure interface 20 drives the corresponding driver interfaces 21, 22, 23 in accordance with the dialogue structure. The response solicitation "input destination" can then, for example, be announced with the aid of the audio driver interface 22 via the loudspeaker 30.2 and simultaneously displayed on the display screen 13.1.

The structure interface 20 thereby delivers the information to be displayed, that is to say in this case the indication "input destination" to the video driver interface 23, which then drives the display screen in accordance with its resolving power and display possibilities. The user input is then performed, for example, acoustically via the microphone 12.2 and the audio driver interface 22, or via the keyboard 12.1 and the tactile/haptic driver interface 21. As soon as the input dialogue is concluded, the structure interface 20 transmits the destination in a data format which can be further processed directly by the navigation system 11.i. If, for example, the display screen 13.1 is not available for outputting input requirements, since it is completely required for monitoring the input or for the input itself, the corresponding input requirement is output by the structure interface 20 only via the audio driver interface 22 by means of the loudspeaker 13.2.

Driving direction instructions of the navigation system 11.i are output in a corresponding way. Once again, only an instruction mark which indicates, for example, the direction indication "move to the right lane further ahead" is transmitted here, as well. Because of this instruction mark, the structure interface 20 then once again accesses an appropriate data record which, for example, describes the individual letters of this instruction, as well as an arrow corresponding thereto. The letter sequence can be used in this case to generate an appropriate announcement, while the arrow is indicated on the display screen.

A radio or CD player connected as an application unit 11 can also be operated in a corresponding way with the aid of the available input/output means 12, 13 via the interface device 10.

The storage device 15 of the interface device 10 can, moreover, also be used to store user-specific data which can be input either via the write/read access 17 directly or using the input/output means 12, 13 via the interface circuit 12 and the write/read access 16. In the case of an connected navigation system, it is possible, for example, for the address details for destinations frequently desired by the user to be stored in the storage device 15 such that they can be accessed with the aid of a corresponding mark. In this case, such a mark is expediently a key word characterizing the destination.

The user of the navigation system need then only input the key word of a desired destination in order to be guided to the latter. The complete input dialogue for the required address details then proceeds only between the navigation system and structure interface.

If a mobile telephone is connected as application unit to the interface device 10, the storage device 15 thereof can likewise be used to store user-specific data. It is possible, in particular, in this case to store frequently required telephone numbers, address information and other personal data under the name of the respective person in the form of so-called contact cards. If the user now wishes to call a specific person, he can search the list of stored names (and thus the associated contact data) with the aid of an appropriate search dialogue which is carried out only between the structure interface 20 of the interface device 10 and the user. Once the desired interlocutor has been found, he can have the data stored in the form of a contact card displayed. If he wishes to telephone the corresponding person, the structure interface carries out an appropriate dialogue with the mobile telephone, transmits to the latter the telephone number to be dialled and starts the dialling operation for setting up call connection.

It is likewise conceivable in this case in connection with a navigation system that, to the extent it contains the required destination details, an address stored on a contact card can also be used as destination for the navigation system and is transmitted to the navigation system with the aid of a corresponding dialogue between the latter and the structure interface.

According to the invention, the output of data, that is of navigation instructions, input response solicitations, system feedback, warnings and the like, for example, is performed in such a way that an application program from an application unit 11 transmits an instruction mark corresponding to the information to be output to a structure program of the structure interface 20. The structure program thereupon reads the data stored under the instruction mark in the storage device 15, and supplies the data to a driver program of a driver interface 21, 22, 23. The driver program, for its part, uses the data corresponding to the information to be output for the purpose of selecting control data suitable for the input/output means 12, 13 respectively available, in order to control the input/output means as a function thereof.

Conversely, the input signals are converted by the driver interfaces 21, 22, 23 into corresponding information data which are then used in the structure interface 20 in order, with the aid of stored input formats and structures, to transmit the input information to the respective application in a form corresponding to the instruction marks.

Thus, according to the invention it is possible with the aid of the interface device for any desired application unit such as, for example, a navigation system, a mobile telephone, a vehicle operating and safety monitoring system or the like to be connected to the respectively available input/output means without the need to change the input/output interfaces of the application units 11. All that is required is to store the information required to operate a unit interface in the storage device 15. This can be performed, for example, via a separate data medium in the access device 18, or by direct inputting via one of the write-read accesses 16, 17.

A further advantage consists in that even new application programs can be used in a simple way with an existing system, since it is merely required to store the input/output formats and dialogue structures required for such a new application program in the storage device 15. In this case, the storage can be carried out, for example, via the application unit 11 used for the new application. In particular, in the case of the desired additional use of new mobile radio services, it is possible for the format and structure data required for this to be received at first use via the mobile radio telephone and written into the storage device 15, with the result that there as no need to carry out any expensive adaptation work.

What is claimed is:

1. Interface device (10) for transmitting information between input/output means (12, 13) and application units (11) in an information and/or communication system, having an interface circuit (14), and a storage device (15), connected to the interface circuit (14) for system data and input/output formats and structures, the interface circuit (14) processing input and/or output information to be transmitted with the aid of the stored input/output formats and structures, in accordance with the stored system data as a function of the input/output means (12, 13) available and outputting said information to the respective application unit (11) and/or to the input/output means (12, 13) available.

2. Interface device according to claim 1, characterized in that the storage device (15) has at least one further write-read access (17) via which further information, in particular system data, input/output formats and structures as well as user-specific data, can be written in from outside, and information already stored can be updated.

3. Interface device according to claim 1, characterized in that the storage device (15) has an access device (18) for reading or for reading and writing data on an exchangeable storage means.

4. Interface device according to claim 1, characterized in that the interface circuit (14) has a structure interface (20) which is connected to the storage device (15), can be connected to application units (11.1, . . . 11.n) via unit interfaces (24.1 . . . 24.n) on the application side, and can be connected to the input/output means (12, 13) via at least one driver interface (21, 22, 23).

5. Interface device according to claim 4, characterized in that an appropriate driver interface (23, 22, 21) is provided both for optical and acoustic and for tactile/haptic input/output means (12, 13).

6. Interface device according to claim 4, characterized in that each driver interface (21, 22, 23) has adaptation means which can be used to adapt the input/output information in accordance with the characteristics of the assigned input/output means (12, 13).

7. An interface device for conveying information between one or more input/output devices and one or more application units, comprising:

a storage device for storing data about the input/output devices and application units, including input/output structures and formats; and an interface circuit connected to the storage device for utilizing the data stored in the storage device to process and format the information for use by the one or more input/output devices or for use by the one or more application units.

8. The interface device of claim 7, wherein the interface circuit comprises:

one or more driver interfaces connected to the one or more input/output devices; and a structure interface connected to the one or more driver interfaces and to the one or more application units, wherein the structure interface exchanges application information with the application units and exchanges user information through the device interfaces with the input/output devices.

9. The interface device of claim 7, wherein the storage device comprises an exchangeable medium.

10. The interface device of claim 7, wherein the storage device comprises a write read access for updating or adding data to the storage device.

11. The interface device of claim 7, wherein the interface circuit is operable to detect the input/output devices and to store data related to the input/output devices on the storage device.

12. The interface device of claim 8, wherein the interface circuit is connected to the storage device and utilizes the storage device data to format the application information sent to the application units and to format the user information sent to the input/output devices.

\* \* \* \* \*

UNITED STATES PATENT AND TRADEMARK OFFICE
CERTIFICATE OF CORRECTION

PATENT NO.    : 6,629,183 B1
DATED         : September 30, 2003
INVENTOR(S)   : Gortz et al.

It is certified that error appears in the above-identified patent and that said Letters Patent is hereby corrected as shown below:

<u>Title page,</u>
Item [30], Foreign Application Data, should be -- 198 48 791.6 --

Signed and Sealed this

Eighteenth Day of May, 2004

JON W. DUDAS
*Acting Director of the United States Patent and Trademark Office*